March 10, 1931. C. G. BUTLER 1,796,259
PNEUMATICALLY OPERATED LUBRICATING APPARATUS
Filed July 16, 1928  4 Sheets-Sheet 1

Inventor
Clyde G. Butler
By Wood & Wood
Attorneys

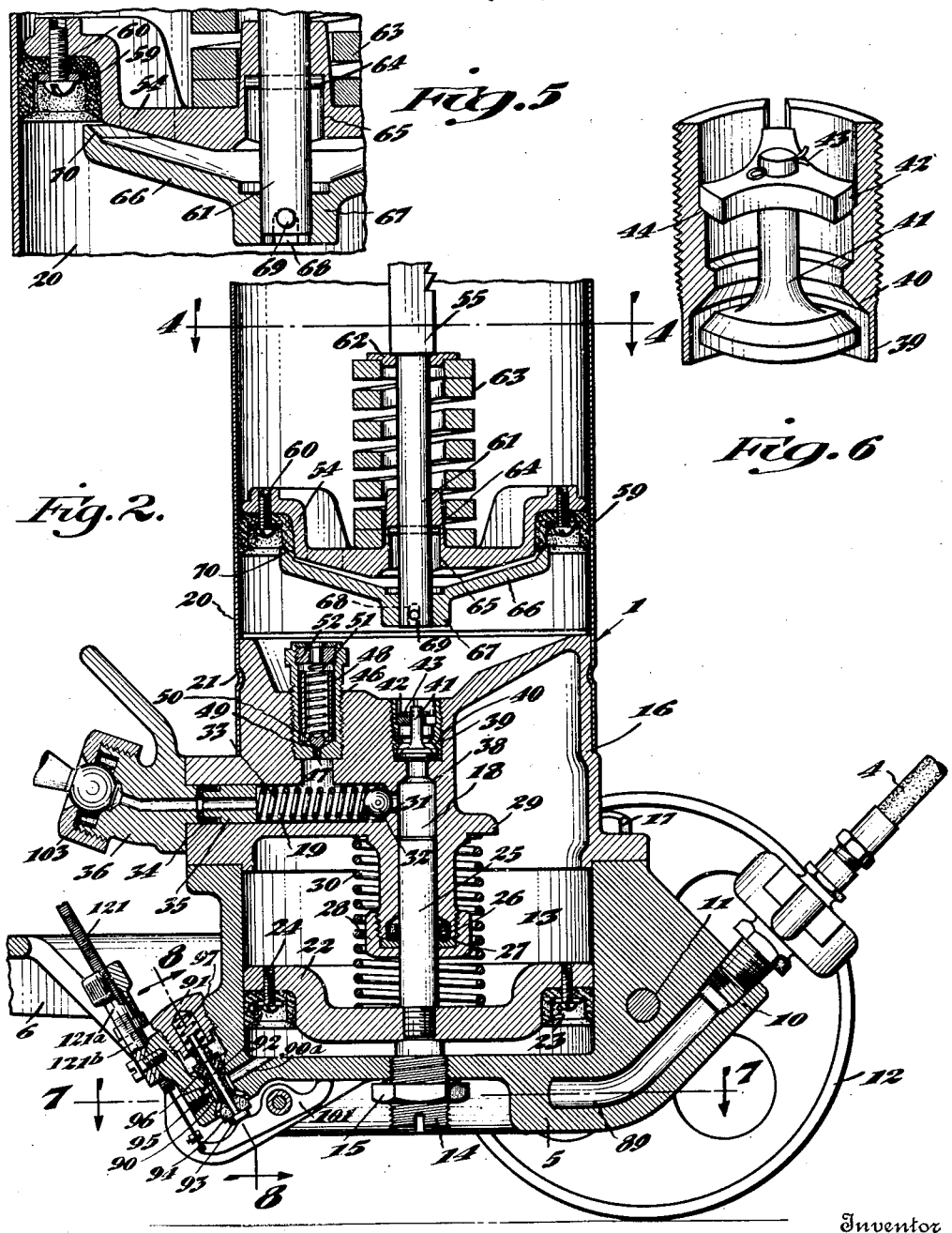

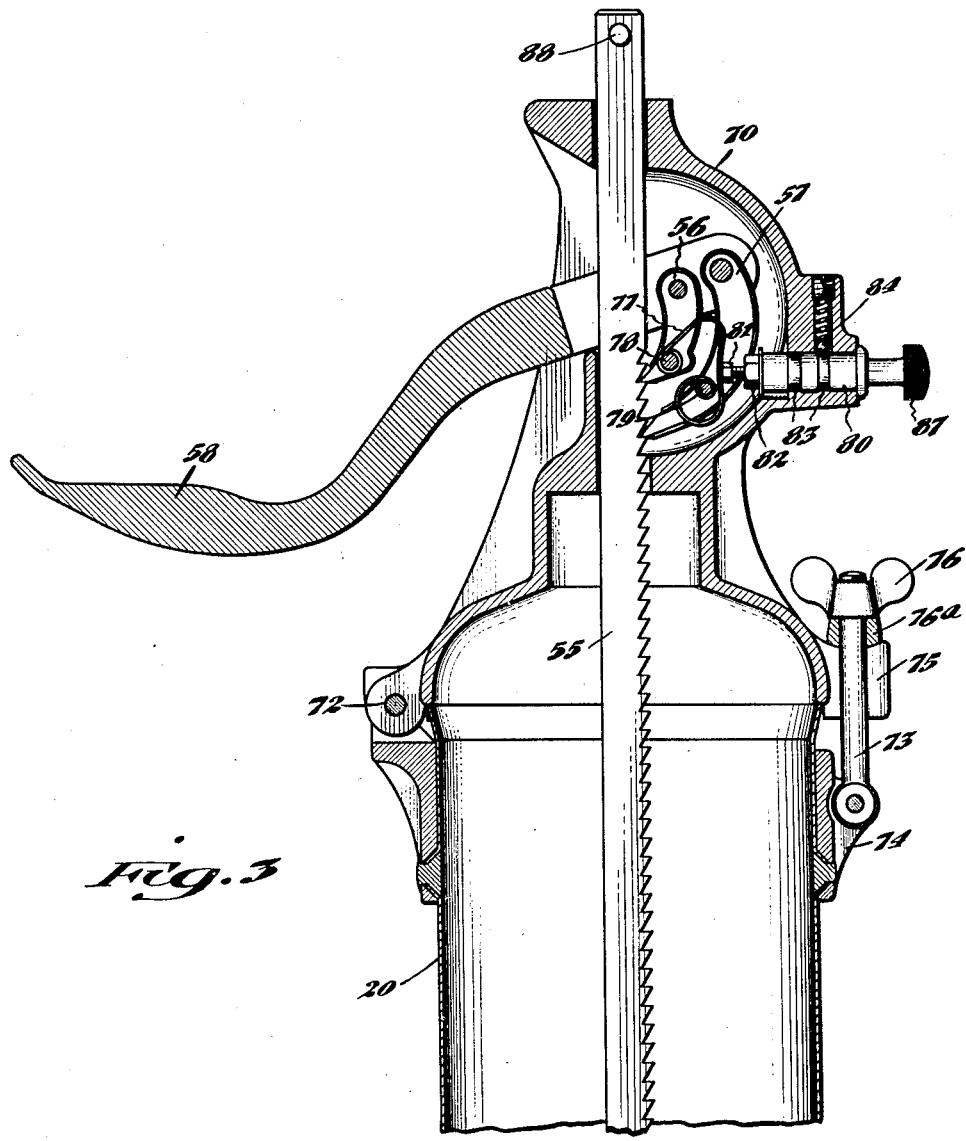

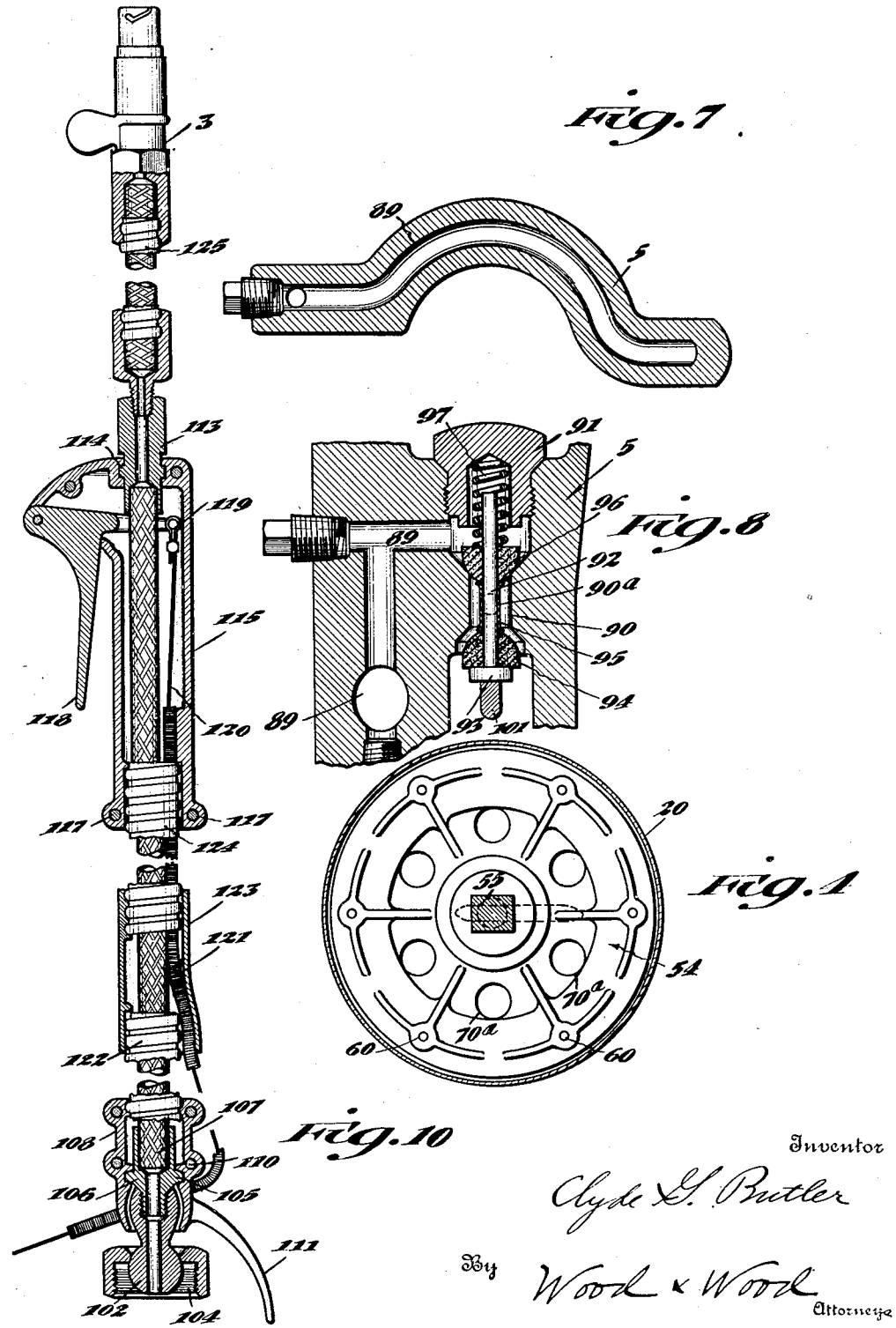

Patented Mar. 10, 1931

1,796,259

UNITED STATES PATENT OFFICE

CLYDE G. BUTLER, OF CINCINNATI, OHIO, ASSIGNOR TO THE CINCINNATI BALL CRANK COMPANY, OF CINCINNATI, OHIO, A CORPORATION OF OHIO

PNEUMATICALLY-OPERATED LUBRICATING APPARATUS

Application filed July 16, 1928. Serial No. 292,980.

This invention relates to pneumatically operated lubricators adapted for use in lubricating systems of the type wherein the machinery to be lubricated is provided with nipples or fittings located at different points thereon and grease or lubricant is supplied to said fittings under pressure, often high pressure, from a pressure-generated instrumentality through a flexible hose line having on its end a nozzle adapted to cooperate with the fittings or nipples to permit grease to be forced therein under the desired pressure.

Lubricating systems of this type are in very common use upon automotive vehicles, machine tools and other factory machinery and power transmitting apparatus. In many of the stations or garages where automobiles are serviced and in many factories where machinery adapted to be lubricated as described is located, air under pressure is already available for the purpose of inflating tires or as a source of power in controlling machinery.

It is the general object of this invention to provide an instrumentality adapted to discharge lubricant under pressure, said instrumentality utilizing compressed air as its operating or pressure generating medium.

It is often impossible or inconvenient to bring the device delivering the lubricant under pressure into the immediate proximity of the nipple being served, and it is also often desirable for the mechanic performing the lubricating operation to be immediately at the fitting being served to observe the effect of the injection of the lubricant.

It is therefore another object of this invention to provide a lubricator of the class described with control connections whereby it can be conveniently rendered active or inactive from a point remote in relation to it in the proximity of the fitting being served.

In order to avoid a multiplicity of lines extending from the lubricator, it is still a further object of the invention to associate a conduit leading from the lubricator, with instrumentalities adapted to control the operation of the lubricator in such wise that the lubricator can conveniently be operated from a point adjacent to the fitting being served.

For many uses these lubricators employ a very heavy grease which does not flow readily. The lubricators are under many conditions of service in relatively constant use so that it is desirable to have associated with the lubricator a relatively large supply reservoir for the lubricant.

Therefore another object of this invention is to provide an instrumentality adapted to store a relatively large quantity of lubricant, adapted to expel this lubricant through a hose line or the like at relatively high pressures and adapted to use compressed air as the source of power for expelling the lubricant under pressure.

Other objects and certain advantages will be more fully set forth in the description of the accompanying drawings forming a part of this specification, in which:

Figure 2 is a sectional view taken centrally and longitudinally of the lower end of the lubricator illustrating the mechanism for pneumatically expelling impulses of grease under high pressure from a source under packing pressure.

Figure 3 is a sectional view taken longitudinally and centrally of the upper end of the lubricator, illustrating the means for maintaining the cap of the lubricator in position and detailing the lever and connection for operating the main booster or follower piston and the jack for controlling the movement of the piston.

Figure 4 is a sectional view taken on line 4—4, Figure 2, detailing the booster or follower piston.

Figure 5 is a fragmentary sectional view taken the same as Figure 2 and enlarged therefrom, to illustrate in detail the construction of the booster piston.

Figure 6 is a sectional perspective view taken centrally of the control valve disposed between the main lubricant supply and the high pressure chamber containing the lubricant fed from the source and traversed by the pneumatically operated forcer piston.

Figure 7 is a sectional view taken on line 7—7, Figure 2, illustrating the arrangement of the air inlet passageway at the base of the lubricator.

Figure 8 is a sectional view taken on line 8—8, Figure 2, detailing the throttle valve for controlling the flow of compressed air to the air operated piston for actuating the forcer piston.

Figure 1:
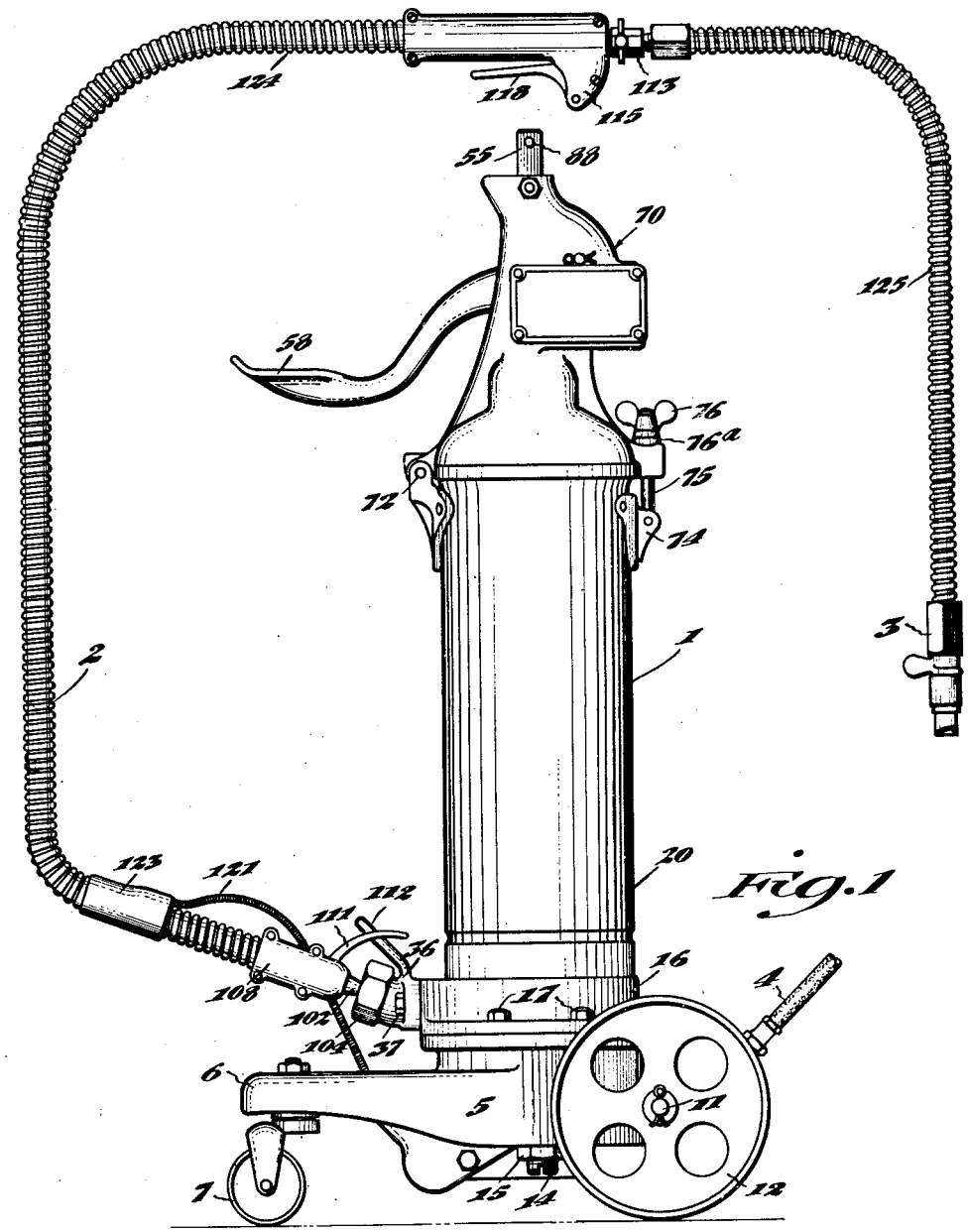
Figure 1 is a side elevation of the lubricator.
Figure 9:
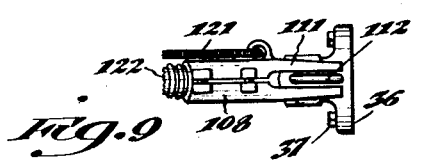
Figure 9 is a top plan view of the swiveling connection of the grease directing line or conduit to the lubricator body.

Figure 10 is a detailed sectional view of the length of conduit or hose for directing the lubricant, the length of hose being broken at various points to permit the showing of the details of the hose in a single view, this view showing in detail the manually operated throttle valve control trigger located near the end of the hose and the arrangement of the control connectors relative to the conduit.

Figure 11 is a sectional view taken centrally of the screw 14 showing the safety valve disposed therein.

Referring to the drawings, the numeral 1 indicates the lubricator, the numeral 2 the conduit or hose line leading from the lubricator through which the lubricant is expelled, the numeral 3 the nozzle at the end of the conduit adapted to make connection with a fitting upon the machinery to be lubricated, and the numeral 4 the conduit conveying the compressed air to the lubricator.

The lubricator comprises generally a reservoir for the lubricant, means for driving the lubricant to one end of the reservoir (if relatively heavy grease is used), a cylinder of relatively small diameter, a valve in a passageway connecting said cylinder and reservoir permitting the lubricant to pass from the reservoir into the cylinder but not in the reverse direction, an outlet from said cylinder connected to the conduit for the lubricant, a piston in said relatively small cylinder, a cylinder of relatively large diameter, a piston in said cylinder of relatively large diameter, mechanical connection between said piston and said first piston, means for admitting pneumatic pressure to the cylinder of relatively large diameter on the side of the piston adapted to cause the relatively small piston to perform a lubricant expelling stroke, means for relieving pressure in said cylinder of relatively large diameter, means for returning the pistons to their initial position when the pneumatic pressure is relieved, and means associated with the hose line for controlling the pneumatic pressure in the cylinder of relatively large diameter.

More specifically, the lubricator comprises a cup-like carriage member 5 provided with a horizontal extension 6 to which is attached a caster 7. From the other side of this carriage projects a flange 10 through which passes a shaft 11 on the outer ends of which are mounted wheels 12. This carriage and the caster and wheels collectively constitute a truck adapting the lubricator to be readily moved about. The interior of the cup portion of the cup-like carriage member 5 constitutes a cylinder 13 which is the cylinder in which the pneumatic pressure is generated, being of relatively large diameter in comparison with the cylinder in which the expelling pressure is generated.

A lower cylinder head 16 is secured on top of the carriage 5 by means of bolts 17, this head being of the same peripheral configuration as the carriage. The head 16 is cast to provide communicating branch conduits within its body, one thereof indicated at 18, being concentric with and longitudinal of the head, and the other, indicated at 19, being disposed radially of the first and extending therefrom to the exterior of the head. The concentrically longitudinally disposed conduit 18 provides the previously described cylinder of relatively small diameter in which the pressure for expelling the lubricant is generated.

The reservoir for the lubricant which is fed into the cylinder of relatively small diameter is in the form of a cylindrical element 20 which is engaged over the outside of the head 16. This cylindrical element is held or mounted relative to the head by compressing the wall thereof into an annular groove 21 formed in the outer wall of the head. By this arrangement of the lower cylinder head 16 and the cup-like carriage, the conduit 18 or cylinder of relatively small diameter is disposed concentric relative to the cylinder 13 of large diameter.

Within the cylinder of relatively large diameter is a piston 22 provided with a packing ring 23, preferably of leather, or the like, secured to the underface of the piston by means of screws 24. Into the upper face of this piston is screwed the piston or plunger 25 which extends into the cylinder of relatively small diameter. The lower or piston traversed end of the conduit providing the cylinder of relatively small diameter is provided with a gland, comprising, packing 26 surrounding the piston or plunger, a washer 27 against the packing and a packing nut 28 screw-threaded on the end of the conduit over the washer.

An adjustable abutment is disposed at the bottom of the cup-like carriage member or base 5, this abutment being a screw 14 threaded into the bottom of the carriage, this screw being disposed concentric of the cylinder 13. A nut 15 is provided on the screw and engages the underside of the carriage for locking the abutment element in set position. This adjustable abutment functions to control the lubricant feeding movement of the piston and consequently governs the amount of lubricant displaced by each movement of the piston.

The exterior of the conduit 18 is provided with a flange 29 spaced from the end thereof, and between this flange and the piston of relatively large diameter is disposed a coiled spring 30 under compression, the function of which is to retain the large piston at the bottom of the cylinder in which it operates except as the compression of the spring may be overcome by pneumatic pressure and to return said piston to such position after the pneumatic pressure is relieved.

The cylinder of relatively small diameter is provided with an outlet through the radially extending conduit 19 of the member 16. This outlet is provided with a valve seat 31 against which is disposed a ball valve 32 held against the seat by a spring 33 under compression in such wise that lubricant having been discharged from the cylinder through this outlet cannot pass back into the cylinder again. A sleeve member 35 is disposed in this outlet and has bearing against the end of this coiled spring to hold it under compression. A cup washer 34 is disposed over the outer end of this sleeve member which is appropriately counterturned for this purpose. On the outside of this cup washer is secured a member 36 which serves as a nozzle for the lubricator itself. This nozzle is secured to the member 16 by means of bolts 37. It is to this nozzle member that the hose line is attached.

At the top of the cylinder of relatively small diameter at a point slightly beyond the outlet is disposed a shoulder 38 adapted to operate as a stop for the piston. Above this shoulder is disposed the valve mechanism which connects the cylinder of relatively small diameter with the reservoir for the lubricant. This valve mechanism comprises a sleeve 39 which is screw-threaded into the top of the central portion of the member 16. Within this sleeve is a valve seat 40 and a mushroom valve 41. The valve is adapted to seat upon the valve seat in such wise that the lubricant may pass from the reservoir into the cylinder of relatively small diameter but not in the reverse direction. The stem of this mushroom valve is slidably disposed in spider 42 being retained thereon against downward displacement by a cotter pin 43. This spider rests on a shoulder 44 on the inside of the sleeve.

Between the outlet passageway and the reservoir is a relief or safety valve which permits lubricant to escape from the outlet passageway back into the reservoir in case the pressure encountered in operation is so great as to endanger the apparatus. This relief valve comprises a sleeve 46 which is screw-threaded into a passageway between the reservoir and the outlet passageway. This sleeve is provided with a valve seat 47 disposed adjacent to the end nearest the outlet passageway. Within the sleeve is a second sleeve 48 provided at one end with a head 49 adapted to constitute a valve in relation to said valve seat and seat upon it in such wise that the lubricant may pass from the outlet passageway back to the reservoir but not in the reverse direction. The sleeve is provided with apertures 50 which permit the lubricant to flow into the same. Within this sleeve is a coiled spring 51 which is held under high compression by means of a nut 52 screwed into the top of the outer sleeve. This nut 52 is provided with a centrally disposed passageway through which the lubricant may pass and enter the main reservoir. The relief or safety valve described may be disposed in the base of the device at a point leading from the cylinder of relatively large diameter permitting an unloading of the air rather than the lubricant. As shown in Figure 11 a spring seated ball valve 53 is disposed in the abutment screw 14 and is unseated by a predetermined air pressure in the cylinder 13. The safety valve may be in either one of the described positions or may be in both for double safety.

At the top of the barrel is disposed a jack mechanism for operating a plunger or piston which forces the lubricant in the reservoir toward one end thereof, in this case the bottom, so that it may pass into the cylinder of relatively small diameter.

The mechanism for performing this function comprises a piston or plunger 54 disposed within the barrel, a ratchet bar 55 extending upwardly therefrom through the top of the cylindrical element or barrel 20, and a pawl member 56 operated by a handle 58 adapted to translate said ratchet downwardly through the barrel to drive the lubricant to one end thereof ahead of the plunger 54.

The plunger 54 is provided with a leather piston ring 59 preferably of cup shape in cross section, secured thereto by means of screws 60. This plunger is attached to a cylindrical extension 61 from the ratchet bar by means of a washer 62 disposed at the top of the cylindrical extension in engagement with the ratchet bar, a coiled spring 63 under compression between said washer and the piston, a pin 64 on the cylindrical extension and a groove 65 within the hub of the plunger 54 through which hub the cylindrical extension passes. The piston is therefore slidable upon this cylindrical extension and movable in relation to the ratchet mechanism to a certain extent. The coiled spring normally holds the plunger advanced to its utmost in relation to the cylindrical extension, i. e., it tends to hold the pin 64 in engagement with the upper end of the groove 65.

On the end of the cylindrical extension is slidably disposed a circular member or valve plate 66 provided with a hub 67 disposed about the cylindrical extension. This hub 67 is provided at its lower end with a cross slot 68 engaged by a pin 69 passing through the end of the cylindrical extension at this point. This pin in this slot retains this circular member or valve plate upon the end of the cylindrical extension and in approximate contact with the piston 54.

The valve plate is annularly flanged providing a valve edge 70 engageable with the inner flange of the packing 59 forming a sealing joint on the downward movement of the piston. As the piston is drawn upwardly the valve plate will be separated from the piston and thus will relieve the piston of any suction action since the air will enter the lubricant chamber from above the piston through apertures 70ª formed in the piston 54.

This resilient interconnection of the plunger 54 with the ratchet, while not necessary is desirable for the purpose of keeping the lubricant under compression and obviates the necessity of operating the pawl and ratchet mechanism each and every time lubricant is discharged. In other words, the flexible connection provides a head pressure stored by operation of the jack to automatically move the piston and maintain during a limited withdrawal of lubricant.

The plunger and jack mechanism are mounted in a casing head 70 which is pivoted to the top of the barrel constituting the reservoir for the lubricant by means of a hinge 72. The reservoir is open for filling with lubricant when this casing head is swung backwardly from the barrel, and after filling can be secured in operating relationship to the barrel by means of a lock comprising a rod 73 pivoted to a boss 74 which is attached to the barrel and a split projection 75 from the casing head between the arms of which the rod 73 is adapted to be swung and a winged nut 76 adapted to be screwed upon the end of the rod to clamp a plate 76ª in the concaved upper surface of the projection from the casing head in such wise as to lock the same to the barrel.

The pawl 56, cooperative with the ratchet and adapted to advance the plunger, is pivoted to the operating handle 58 which is itself pivoted to the casing head. Another pawl member 57 utilizes the same pivot point as the handle, the other pawl being pivoted to the handle between this pivot point and the operating end of the handle which extends to the outside of the casing head.

A spring 77 has the respective ends thereof attached to the respective outer ends of the pawl members 56, 57 to pins 78 and 79. This spring is in turn intermediately engaged by a plunger 80 mounted in the casing head. This plunger has an adjustable end which engages the spring, said end comprising a bolt 81 screw-threaded into the end of the plunger and adjustably secured in relation thereto by a lock nut 82. This plunger is provided with two annular grooves 83 adapted to be selectively engaged by a detent 84. The outer end of the plunger member is provided with a knurled head 87 by which it is adjusted.

The object of these grooves and detent is to hold the plunger against accidental displacement either in the position most advanced into the casing head, in which case it holds the pawls against the ratchet, or in a withdrawn position in which case the pawls may fall free of the ratchet and the plunger 54 at the lower end of the ratchet bar may be withdrawn from the barrel into the casing head by lifting the ratchet rod by means of a handle 88 disposed in the upper end of the ratchet bar which extends through the top of the casing head. The pawl 56 having the swinging pivot is the piston actuating pawl whereas the pawl 57 functions to maintain the piston in set position.

This entire mechanism constitutes a jack adapted to operate the plunger 54 to force the lubricant to one end of the reservoir and into the cylinder of relatively small diameter. Other types of jack mechanism can be used interchangeably with the one shown and described.

As disclosed, the pipe line 4 from the source of pneumatic pressure is connected to the lubricator on the side opposite to that from which the lubricant is discharged. The intake 89 (see Fig. 7) extends from this point of connection around the lubricator and under it to a point below that at which the lubricant is discharged. At this place is disposed the valve mechanism adapted to control the pressure in the cylinder of relatively large diameter.

This valve mechanism comprises a passageway 90 in the base member 5 an intermediate portion of which is connected by a conduit 90ª with the cylinder of relatively large diameter on the underside of the piston. On either side of this point of connection of the conduit with the passageway is disposed a valve seat in the passageway. One end of the passageway opens to the outside. In the other end of the passageway is secured a plug 91.

The valve mechanism comprises a rod 92 having a headed end 93 disposed on the outside of the passageway. Adjacent to this headed end is a pliable valve member 94 adapted to cooperate with the adjacent valve seat to close the passageway to the outside. A spacer sleeve 95 is disposed about the rod adjacent to this valve member and adjacent the other end of the sleeve is a second pliable valve member 96 adapted to cooperate with its adjacent valve seat to open and close the passageway at a point just above the connection with the interior of the cylinder of large diameter. Adjacent to this valve member 96 is a spring 97 coiled about the end of the rod and bearing against the valve member, being held under compression between said valve member and a recess in the plug 91 at the top of the passageway.

The conduit conveying the compressed air is connected to this passageway above the valve member last described so that when this upper valve member is unseated and the lower valve member is seated the air under pressure passes into the cylinder of relatively large diameter. When this upper valve member is seated and the lower valve member is unseated the interior of the cylinder of relatively large diameter is directly connected with the outside so that air under pressure may escape to the outside and the spring within the cylinder of relatively large diameter return the piston to initial position.

A lever 101 is pivoted to the base member 5 just adjacent to the head 93 of the rod 92 so as to engage the same to operate the valve mechanism against the force of the coiled spring 97.

The hose line 2 is connected to the nozzle of the lubricator proper by means of a universal joint connection comprising a tubular member 102 having a ball-shaped end which seats upon the outer end of the passageway through the nozzle member. About this ball-shaped member is disposed packing 103 which is held in place by a sleeve nut 104 screw-threaded upon the outer end of the nozzle member. This sleeve nut also holds the ball-shaped end of the tubular member 102 in engagement with the passageway in the nozzle member. Into the other end of the tubular member 102 is screwed a sleeve 105 provided with an external flange 106. Into the outer end of this sleeve is secured a flexible conduit 107 which extends away from the lubricator to the point at which the control mechanism is located.

About the tubular member 102 and the sleeve screwed into its end is disposed a casing 108 made up of two parts, secured together by means of screws, rivets or the like 110 and held against displacement by flange 106. Each of the parts of the casing 108 is provided with an upwardly extending arm 111. A stop member 112 extends upwardly from the nozzle of the lubricator between these two arms so that rotation of the casing relative to the nozzle is impossible, thereby preventing entangling of an air inlet control wire 120 connected to the lever 101 and a conduit extending to the outer end of the hose line.

At the end of the flexible conduit is disposed a coupling member 113 provided with an external flange 114. About this member and secured in position on the conduit by the external flange is disposed a casing 115 made up of halves, secured together by means of rivets, screws or the like, 117. Pivoted within this casing member is a trigger 118. This trigger member operates rather like a bell crank lever, one arm extending to the outside of the casing for manual operation, the other arm extending within the casing and having on its end a pin 119 to which is secured the beforementioned control wire 120.

This wire extends back along the conduit and is attached to the lever 101 associated with the valve mechanism which controls the introduction of air into the cylinder of relatively large diameter. A flexible conduit 121 surrounds this wire and extends from the casing 115 back to the lubricator. One end of the tube is connected to the casing 115 and the other end to the base member 5 of the lubricator.

This conduit is adjustably attached to the base 5 adjacent the connection of the wire to the lever 101. A nut 121ª is rotatably mounted in a plate 121ᵇ attached to the base, the nut being threaded to the winding of the conduit for translating the conduit. This permits the slack of the conduit at the joint of the hose to be adjusted to the proper amount. Therefore, depressing the trigger pulls the wire which actuates the lever engaging the headed end of the rod on which the valve members are mounted and simultaneously closes the vent to the cylinder of relatively large diameter and opens the latter to the pneumatic pressure servicing the lubricator.

A large flexible conduit 122 is disposed about the lubricant conduit, between the casing 108 and a point a slight distance therefrom where a sleeve 123 is disposed about the lubricant conduit. The tube 121 surrounding the wire enters within this sleeve and continues adjacent to the conduit through a flexible conduit continuation 124 which extends between this sleeve and the casing 115 so that this conduit contains both the lubricant conduit and the conduit through which the control wire passes.

On the outer end of the coupling member 113 is disposed a second flexible conduit 125 of conventional structure, on the end of which is disposed the special nozzle 3 which is adapted to make connection with the fittings or nipples on the machinery to be lubricated.

In use, the reservoir is filled with lubricant, the casing head secured to the top of the barrel and the jack operated to force the plunger against the lubricant to thus force the lubricant down into the reservoir through the valve and into the cylinder of relatively small diameter. The trigger is then repeatedly depressed to pump the hose line full of grease. Every time it is depressed, air is admitted under pressure into the cylinder of relatively large diameter and the piston elevated, thus expelling grease from the cylinder of relatively small diameter through the outlet and through the hose line. Each time the trigger is released, the valve mechanism cuts off the supply of compressed air and opens the cylinder of relatively large diameter to the outside. The spring in the cylinder of relatively large diameter thereupon returns the pistons to their initial position, the pressure of the plunger and jack in the meantime forcing more lubricant into the cylinder of relatively small diameter.

When the hose line has been filled with grease, the nozzle at the end thereof is connected to the fitting on the bearing to be lubricated and the trigger depressed. The compressed air thereupon elevates the piston in the cylinder of relatively large diameter which creates very high pressure upon the lubricant in the cylinder of relatively small diameter thereby expelling the same through the outlet through the hose line and forcing grease into the bearing to be lubricated.

The stop members associated with the universal connection of the hose line to the lubricator prevent rotation of the hose line which would be detrimental to the control wire connection between the trigger and the valve mechanism.

A lubricator of the type disclosed is highly adapted to be moved about easily in a garage or in a factory, the relatively long hose line facilitates the lubrication of inaccessible bearings, and the operating trigger associated with the hose line avoids waste motion on the part of the operator and also permits the operator to watch the progress of the lubrication of the bearings more closely.

Having described my invention, I claim:

In a lubricator of the class described, a cup shaped air cylinder, a piston in said cylinder, means for supplying air to the cylinder, an axially disposed plunger extending upwardly from said piston, a cup shaped cylinder head disposed in inverted position over the cup shaped air cylinder, said cup shaped cylinder head having a centrally formed boss containing a high pressure grease chamber, said plunger traversing said chamber, a grease reservoir secured on said cylinder head, means for urging the grease downwardly in said reservoir, said reservoir and high pressure chamber in communication, a valve in the connecting passageway therebetween, for controlling the intake of grease into the high pressure chamber upon a down stroke of the plunger, a discharge passageway extending from said high pressure chamber, and a valve therein, said valve adapted to open under grease expulsion upward stroke of the plunger.

In witness whereof, I hereunto subscribe my name.

CLYDE G. BUTLER.